(12) United States Patent
Neal et al.

(10) Patent No.: US 9,736,399 B2
(45) Date of Patent: *Aug. 15, 2017

(54) SYSTEM ARCHITECTURE FOR THERMAL IMAGING AND THERMOGRAPHY CAMERAS

(71) Applicant: DRS RSTA, INC., Melbourne, FL (US)

(72) Inventors: Henry W. Neal, Allen, TX (US); Richard L. Southerland, Plano, TX (US); Jeff R. Emmett, Sachse, TX (US); Mark S. Knapp, Plano, TX (US); James K. Malone, II, The Colony, TX (US); Douglas A. Blettner, Dallas, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 355 days.

This patent is subject to a terminal disclaimer.

(21) Appl. No.: 14/208,615

(22) Filed: Mar. 13, 2014

(65) Prior Publication Data

US 2015/0271420 A1 Sep. 24, 2015

Related U.S. Application Data

(60) Provisional application No. 61/785,267, filed on Mar. 14, 2013, provisional application No. 61/785,224, filed on Mar. 14, 2013.

(51) Int. Cl.
*H04N 5/33* (2006.01)
*H04N 5/44* (2011.01)
*H04N 5/911* (2006.01)

(52) U.S. Cl.
CPC ............ *H04N 5/33* (2013.01); *H04N 5/44* (2013.01); *H04N 5/911* (2013.01)

(58) Field of Classification Search
None
See application file for complete search history.

(56) References Cited

U.S. PATENT DOCUMENTS 7,470,902 B1 12/2008 Kraemer et al.
8,003,941 B1 * 8/2011 Heinke .................... G01J 5/02
250/330

(Continued)

FOREIGN PATENT DOCUMENTS

CN 102178510 A 9/2011
CN 102572094 A 7/2012
(Continued)

OTHER PUBLICATIONS

International Application No. PCT/US2014/026265 filed on Mar. 14, 2014 by DRS RSTA, Inc.

(Continued)

*Primary Examiner* — Dakshesh Parikh
(74) *Attorney, Agent, or Firm* — Kilpatrick Townsend & Stockton LLP

(57) ABSTRACT

A thermal imaging camera includes an infrared detector operable to capture thermal video data, a processor coupled to the infrared detector and operable to process the thermal video data, and at least one communications interface operable to communicate the processed thermal video data to a consumer mobile device coupled thereto.

22 Claims, 10 Drawing Sheets

(56) References Cited

U.S. PATENT DOCUMENTS

| | | | | |
|---|---|---|---|---|
| 2010/0182330 A1* | 7/2010 | Tener | ................ | G06T 1/20 |
| | | | | 345/519 |
| 2013/0072120 A1* | 3/2013 | Wu | ................ | G08C 17/02 |
| | | | | 455/41.2 |
| 2013/0258111 A1* | 10/2013 | Frank | ................ | H04N 5/33 |
| | | | | 348/164 |

FOREIGN PATENT DOCUMENTS

| | | | | |
|---|---|---|---|---|
| JP | 2016519867 | 7/2016 | | |
| WO | 2012/170946 A2 | 12/2012 | | |
| WO | WO 2012/170953 A2 * | 12/2012 | ............... | H04N 5/33 |
| WO | WO 2014159758 | 10/2014 | | |

OTHER PUBLICATIONS

International Application No. PCT/US2014/027610 filed on Mar. 14, 2014 by DRS RSTA, Inc.
U.S. Appl. No. 14/211,796, filed Mar. 14, 2014 by Bailey et al.
Notification of Transmittal of the International Search Report and the Written Opinion of the International Searching Authority, or the Declaration and International Search Report and Written Opinion of the International Searching Authority for International Application No. PCT/US2014/025022, mailed on Jun. 27, 2014, 9 pages.
EP14776487.2 , "Extended European Search Report", Jun. 29, 2016, 10 pages.
PCT/US2014/025022 , "International Search Report and Written Opinion", Jun. 27, 2014, 9 pages.

\* cited by examiner

SYSTEM ARCHITECTURE FOR THERMAL IMAGING AND THERMOGRAPHY CAMERAS

CROSS-REFERENCES TO RELATED APPLICATIONS

This application claims priority to U.S. Provisional Patent Application No. 61/785,267, filed Mar. 14, 2013, entitled "System Architecture for Thermal Imaging and Thermography Cameras," and U.S. Provisional Patent Application No. 61/785,224, filed Mar. 14, 2013, entitled "Parallax Reduction for Multi-Sensor Camera Systems," the disclosures of which are hereby incorporated in their entirety by reference for all purposes.

BACKGROUND OF THE INVENTION

Thermal imaging cameras are thermographic cameras that provide information on heat signatures of objects. By rendering infrared radiation as visible light, thermal imaging cameras enable users to visualize the temperature of elements in a scene. Thermal imaging cameras are typically handheld and integrate an infrared sensor with a display unit.

Despite the progress made in the field of thermal imaging cameras, there is a need in the art for improved methods and systems related to thermal imaging cameras.

SUMMARY OF THE INVENTION

The techniques described herein relate generally to thermal imaging systems. More specifically, the techniques described herein relate to a thermal imaging system with an expandable architecture. According to one embodiment, a thermal imaging system is provided that includes an expandable architecture configured to provide basic thermography functions using a thermal imaging camera and to provide enhanced functions utilizing capabilities of a consumer device. The thermal imaging camera includes an infrared detector to capture thermographic data, a processor coupled with the infrared detector to process the thermographic data, and at least one interface to communicate the thermographic data to a consumer device coupled with the thermal imaging system via a wired or wireless connection. The functions provided by the consumer device include, but are not limited to, basic camera functions, display functions, and control functions. The expandable architecture integrates the capabilities of the consumer device with the capabilities of the thermal imaging camera such that certain hardware and software components of the expandable architecture are provided by the thermal imaging camera and the remaining hardware and software components are provided by the consumer device or applications running thereon.

The expandable architecture integrates hardware and software capabilities of the consumer device with capabilities of the thermal imaging camera such that certain hardware and software components are provided by the thermal imaging camera and the remaining hardware and software components are provided by the consumer device or applications running thereon. The expandable architecture is also adapted to be compatible with any number of different consumer devices having different applications running thereon. The thermal imaging camera can be coupled with the consumer device via a Universal Serial Bus ("USB") connection, a WiFi network connection, a Bluetooth connection, or any other wired or wireless connection.

In yet other embodiment, a method in a thermal imaging system is provided that includes delegating functions of the thermal imaging system between a thermal imaging camera and a consumer device coupled therewith. The method includes capturing thermographic data using an infrared detector of the thermal imaging camera, processing the thermographic data using a processor coupled with the infrared detector, and providing the thermographic data via an interface of the thermal imaging system that is adapted to couple with the consumer device. The thermographic data can be displayed on the consumer device.

According to a specific embodiment of the present invention, a thermal imaging camera is provided. The thermal imaging camera includes an infrared detector operable to capture thermal video data, a processor coupled to the infrared detector and operable to process the thermal video data, and at least one communications interface operable to communicate the processed thermal video data to a consumer mobile device coupled thereto.

According to another specific embodiment of the present invention, a method of operating a thermal imaging camera is provided. The method includes capturing thermal video data using an infrared detector of the thermal imaging camera, processing the thermal video data using a processor coupled to the infrared detector, and providing the processed thermal data via an interface of the thermal imaging system to a consumer mobile device for display on the consumer mobile device.

According to yet another specific embodiment of the present invention, a thermal imaging system is provided. The thermal imaging system includes a thermal imaging camera including an infrared detector operable to capture thermographic data; a processor coupled to the infrared detector and operable to process the thermographic data; and at least one communications interface. The thermal imaging system also includes a consumer mobile device communicatively coupled to the thermal imaging camera.

Numerous benefits can be achieved by way of the techniques described herein over conventional techniques. For example, embodiments are compatible with any number of consumer devices and can incorporate new features available on these devices as they are developed by third parties. This reduces the overall cost of a thermal imaging system by pushing features onto the consumer devices instead of developing those features and providing them in the thermal imaging camera. Many consumers already have these devices and can use them to leverage enhanced functions for integration with the thermal imaging system. Additional features of the system, including features that may be currently unforeseen, can be added through development of any number of applications configured to run on the consumer devices.

These and other embodiments along with many of their advantages and features are described in more detail in conjunction with the following description, claims, and figures.

BRIEF DESCRIPTION OF THE DRAWINGS

A better understanding of at least certain embodiments of the invention can be obtained from the following detailed description in conjunction with the following drawings, in which.

DETAILED DESCRIPTION OF SPECIFIC EMBODIMENTS

Figure 1:
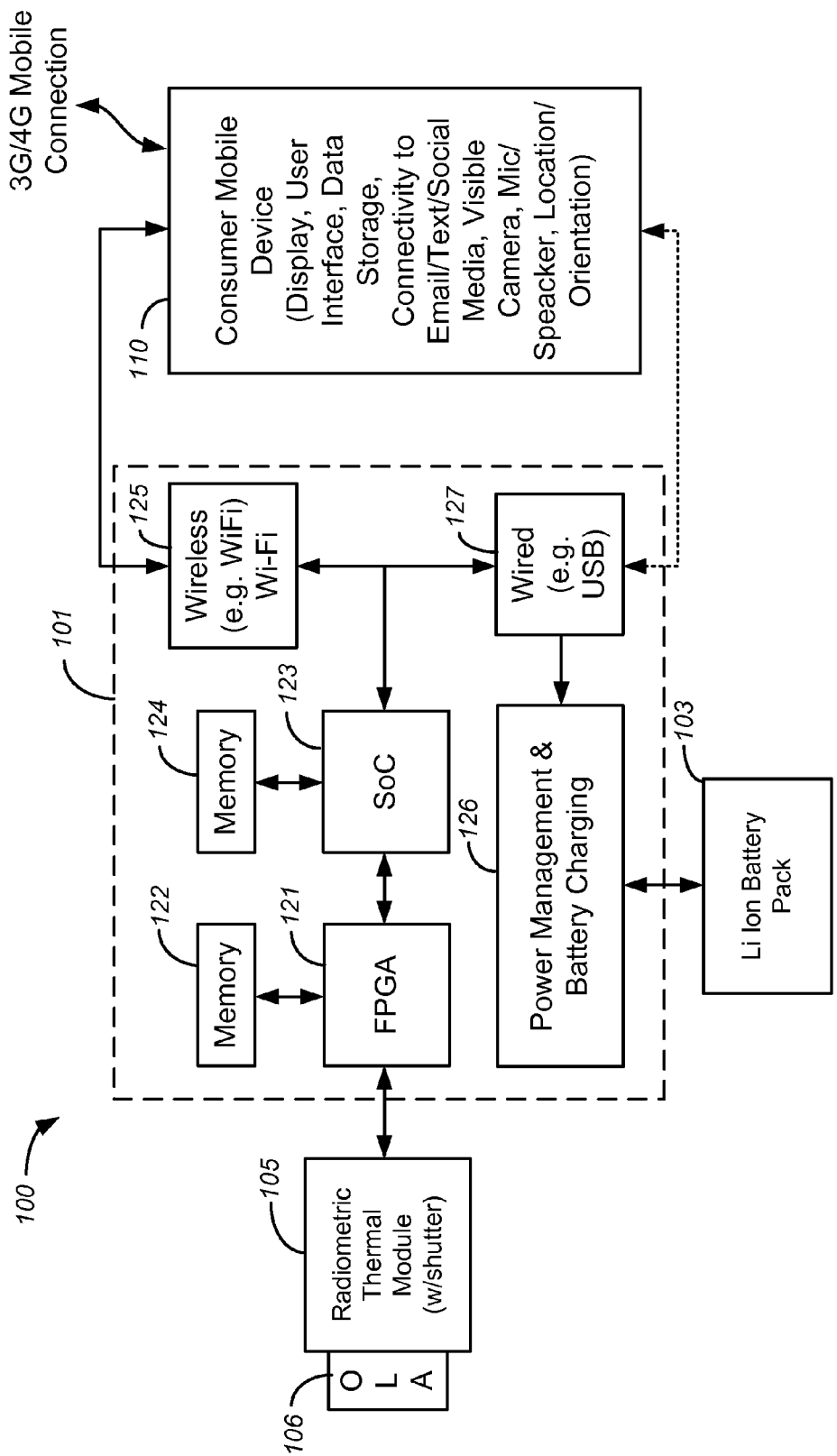
FIG. 1 is a simplified block diagram of a thermal imaging system according to an embodiment of the present invention.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The systems and methods introduced herein provide a thermal imaging system that includes an expandable architecture configured to provide basic thermography functions using a thermal imaging camera and to provide enhanced functions utilizing capabilities of a consumer mobile device (also referred to as a consumer device). The thermal imaging camera includes a thermal sensor (i.e., infrared detector) to capture thermographic data, a processor coupled with the thermal sensor to process the thermographic data, and at least one interface to communicate the thermographic data to a consumer device coupled with the thermal imaging system. The functions provided by the consumer device can include basic camera functions, display functions, and control functions. But any number of functions can be provided by the consumer device and/or the applications running thereon. In addition, the techniques described herein are not limited to thermal imaging devices as these techniques can be used with any non-visible imaging systems such as medical resonance imaging ("MRI") systems, x-ray imaging systems, acoustic imaging systems, and the like.

The expandable architecture integrates hardware and software capabilities of the consumer device with capabilities of the thermal imaging camera such that certain hardware and software components of the expandable architecture are provided by the thermal imaging camera and the remaining hardware and software components are provided by the consumer device or applications running thereon. The expandable architecture is also adapted to be compatible with any number of different consumer devices running different applications. The thermal imaging camera can be coupled with the consumer device via a Universal Serial Bus ("USB") connection, a WiFi network connection, a Bluetooth connection, or any other wired or wireless connection.

In yet other embodiment, a method in a thermal imaging system is provided that includes delegating functions of the thermal imaging system between a thermal imaging camera and a consumer device coupled therewith. The method includes capturing thermographic data using an infrared detector of the thermal imaging camera, processing the thermographic data using a processor coupled with the infrared detector, and providing the thermographic data via an interface of the thermal imaging system that is adapted to couple with the consumer device. In at least certain embodiments, the interface can be a WiFi or USB interface. The thermographic data can be image or video data and may include thermal images, ambient and scene temperature data, etc. The thermal imaging camera may further be configured to provide image or video throttling functions, temperature data throttling, monochrome video output, YCbCr conversion capability or H.264 encoding, etc.

The thermographic data can then be displayed on the consumer device. The described embodiments are compatible with any number of consumer devices and can incorporate new features available on these devices as they are developed by third parties. For instance, the consumer device can provide many of the system functions such as powering the system, battery functions, USB and LED ports, as well as many basic camera functions, etc. In some embodiments, the USB connector (e.g., a micro USB connector), can be utilized for performing software updates, battery charging, and the like. Additional features of the system, including unforeseen features, can also be added through development of any number of applications configured to run on the consumer devices. Applications can be developed for the consumer devices that provide enhanced functions to the thermal imaging system. For instance, applications running on the consumer devices can be configured to perform display and user interface functions, command and control functions, image or video capture and storage functions, temperature measurements and calculations, remote access functions, symbology, report processing, data storage and backup (e.g., via cloud computing), PC interface functions, color palettes, connectivity, web access, email, messaging, and social media functions, etc.

FIG. 1 depicts an example block diagram of a thermal imaging system according to one embodiment. In the illustrated embodiment, thermal imaging system 100 includes a thermal processor and power supply unit 101 coupled with a radiometric thermal module 105 and a consumer mobile device 110. The radiometric thermal module 105 includes a thermal sensor (i.e., infrared detector) coupled with an objective lens assembly ("OLA") 106 to capture and focus thermal infrared energy (e.g., thermal images or video) onto the thermal sensor in the radiometric thermal module. The radiometric thermal module 105 outputs raw thermal data to the thermal processor 101 in some embodiments. A shutter is provided as a component of the radiometric thermal module in order to enable the detector to be screened from radiation to perform periodic non-uniformity corrections, for calibration, shut down, or the like. The analog signal from the thermal sensor in the radiometric thermal module is converted into a digital signal, which is sent to FPGA 121.

Thermal processor 101 provides power, timing, and shutter control functions to the radiometric thermal module 105 among other functions. As illustrated in FIG. 1, the thermal processor 101 can be powered using a rechargeable lithium ion battery pack 103 or other suitable power supply that provides power to the thermal system including the thermal processor and the radiometric thermal module. The lithium ion battery pack 103 provides power to/from the power management and battery charging unit 126 and can be charged through the USB interface 127.

The thermal processor 101 includes an FPGA 121 that receives data (e.g., thermal image and video data) from the radiometric thermal module 105 and transmits power, timing information, and shutter control information to the radiometric thermal module. The FPGA 121 is coupled to a memory 122 that stores data from the FPGA and provides data to the FPGA as appropriate. The thermal processor 101 also includes a System on a Chip (SoC), which can also be referred to as a processing unit, that performs thermal image and video processing functions and is coupled to a memory 124. In some embodiments, the FPGA 121 and SoC 123 are combined into a single processing unit and memory 122 and memory 124 are combined into a single memory unit. One of ordinary skill in the art would recognize many variations, modifications, and alternatives.

Functionality provided by the FPGA 121 can include non-uniformity correction (NUC), bad pixel replacement (BPR), generation of a temperature map for the scene, frame integration, spatial and temporal filtering, resolution and frame rate control, contrast enhancement (e.g., adaptive gain control (AGC), and the like on the imagery. In addition, the FPGA creates a full-resolution temperature map of the image using a lookup table (LUT). The FPGA can interact with memory 122 or provide its own memory to perform these image processing functions.

The FPGA sends this thermal video imagery as well as the temperature map data to the System-on-Chip (SoC) processor, which formats this data for transmission over WiFi to a Consumer Mobile Device in one embodiment. Functionality provided by the SoC can include communications interfaces (e.g., WiFi and/or USB), system communications, video throttling (e.g., 30 Hz/9 Hz), temperature data throttling (e.g., to 1 Hz), monochrome video output, YCbCr conversion, video compression (e.g., H.264 encoding), and the like. Additionally, the SoC may send the imagery and temperature data to the mobile device using a USB connection. The SoC can interact with memory 124 or provide its own memory to perform these functions.

Communications functions can be provided by the combination of the SoC 123 and a wireless communications interface 125 and a wired communications interface 127. In exemplary embodiments, the wireless communications interface 125 is a Wi-Fi interface and the wired communications interface 127 is a USB interface, but other suitable communications protocols and interfaces can be utilized according to embodiments of the present invention. The wireless and wired communications interfaces provide communication functionality with the consumer mobile device 110 as described more fully below. Utilizing embodiments of the present invention, the operating functions can be distributed between the thermal processor 101 and the consumer mobile device 110, with the consumer mobile device providing display functions, a user interface, data storage, connectivity to other systems including email, texting, social media, and the like, a visible light camera, a microphone/speaker, location information, and orientation information. Other functions can be provided as appropriate to the particular application. As an example, control signals can be received at the thermal processor of the thermal imaging camera from the consumer mobile device to perform a shutter calibration, to perform gain level adjustments, selection of a predetermined gain, ADC settings, to select different dynamic ranges, or the like. Exemplary functions that can be performed by the consumer mobile device include the Graphical User Interface (GUI), provision of color palettes, temperature measurements, graybody temperature calculations, mobile device connectivity (e.g., file system, email, messaging, social networking), and the like. One of ordinary skill in the art would recognize many variations, modifications, and alternatives.

Thus, as illustrated in FIG. 1, the coupling of thermal processor 101 and the consumer mobile device 110 enables the exchange of thermographic data and user interface ("UI") command and control functions therebetween. Thermal processor 101 provides thermographic data including thermal images, ambient and scene temperature data, and symbology to the consumer mobile device 110. The consumer mobile device 110 communicates with one or more networks and can be configured to provide data storage and backup functions as discussed above. In one embodiment, the data storage and backup functions can be cloud-based.

The thermal imaging system illustrated in FIG. 1 utilizes an expandable architecture that provides a functionality not available using conventional systems. The various components of the expandable architecture can be distributed between the thermal imaging camera and consumer mobile device or applications running thereon. Accordingly, the expandable architecture integrates hardware and software capabilities of the consumer mobile device with capabilities of the thermal imaging camera. In some implementations, the expandable architecture provides a thermal camera that is compatible with different consumer mobile devices having different applications running thereon. Embodiments of the present invention provide core thermal camera functionality in the thermal camera and user interface, radiometric or other image-processing functions, and the like in the consumer mobile device, enabling third parties and end users to perform independent App development not available in conventional systems.

As illustrated in FIG. 1, the illustrated system architecture allocates certain system functions of a thermal imaging system, e.g., display, user interface, data storage, network connectivity, and the like to a consumer mobile device that a user possesses and which is suitable for performing these functions as well as others (e.g., visible imaging, audio in/out, location & orientation determination) that may be integrated into the overall system functionality. By allocating these system functions to these consumer mobile device, devices that are regularly updated and enhanced, and for which extensive support and infrastructure already exists, the overall cost of the thermal imaging system is reduced and system flexibility is greatly increased.

In a particular embodiment, the thermal imaging system utilizes a 17 µm, 320×240 long-wave infrared (LWIR) microbolometer sensor to collect infrared video data. The infrared data can be processed and transmitted in either uncompressed video or H.264 compressed video over a WiFi video transfer interface or a wired interface to a consumer mobile device such an iPhone™, an Android™ device, or other suitable mobile devices including tablets, laptop computers, and the like. The thermal imaging camera can utilize a manual or automatic focus system with a 40° field of view using a single-element f/1.5 lens. In other implementations, the resolution of the sensor, the wavelength sensitivity of the detector, the data frame rate, the field of view of the optical system, and the like can be adjusted to meet the particular application. Embodiments of the present invention provide accurate temperature measurements (e.g., +/−2° C. or +/−2% over 10° C.-35° C. ambient temperatures) and multiple user-selectable scene dynamic ranges (e.g., −20° C. to 120° C., 0° C. to 650° C., or the like). Mobile Apps can be used for Camera Control, Image Capture, Temperature Measurement, Social Media, and other suitable features.

Figure 2:
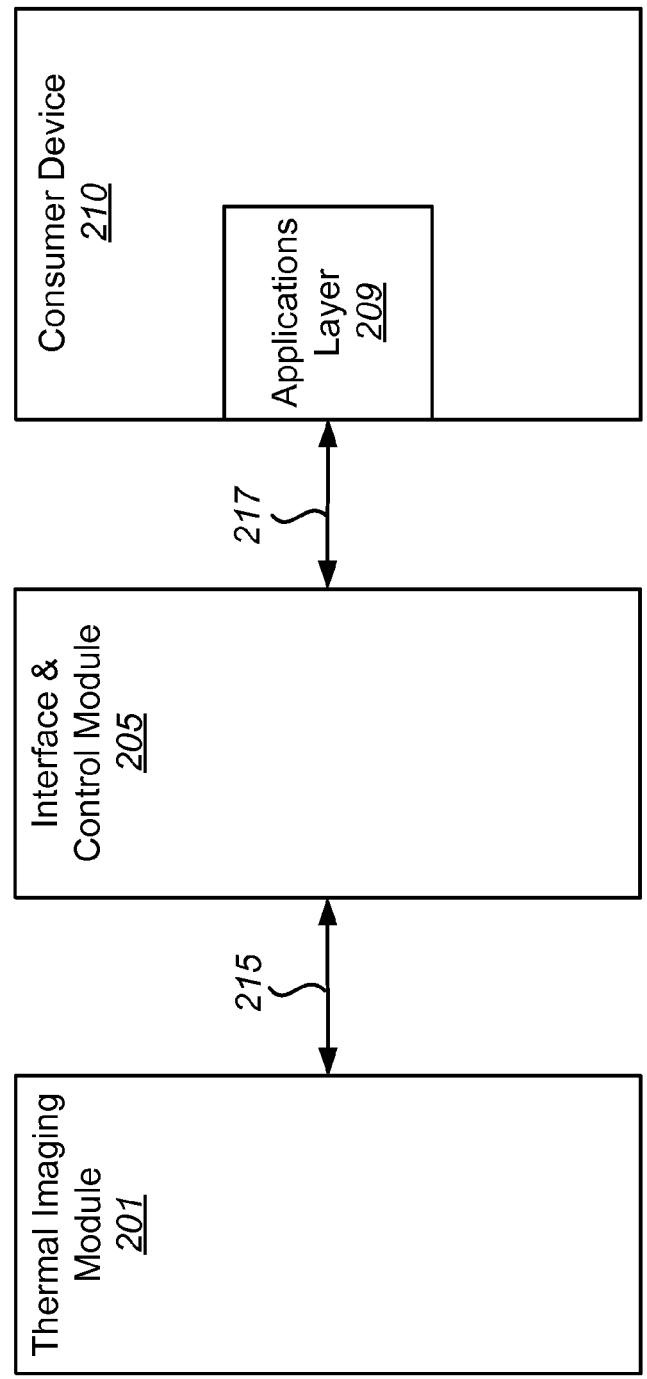
FIG. 2 is a simplified block diagram of a thermal imaging system architecture according to an embodiment of the present invention.

FIG. 2 depicts an example block diagram of a thermal imaging system architecture according to one embodiment. The techniques introduced herein include an expandable architecture that is adapted to share functionality between the thermal imaging camera and a consumer device coupled therewith. In the illustrated embodiment, architecture 200 includes a thermal image module 201, interface and control module 205, and consumer device 210 (also referred to as a consumer mobile device). Consumer device 210 further includes an applications layer 209. Thermal module 201 is coupled together with interface and control module 205 via an interconnect 215 and the interface and control module 205 is further coupled with the consumer device 210 via an interconnect 217. Interconnects 215 and 217 can be any wired or wireless connections as discussed above.

The functions of the parts of the architecture can reside on either the thermal imaging module 201, the interface module 205, or the connected consumer device 210. In one embodiment, the functions and components of the thermal imaging module 201 are provided on an integrated circuit such as a Field Programmable Gate Array ("FPGA"), programmable logic device ("PLD"), applications specific integrated circuit ("ASIC"), system-on-a-chip ("SoC"), custom circuitry, or any combinations or equivalents thereof as illustrated in FIG. 1. Thermal imaging functions 201, in at least certain embodiments, can include non-uniformity correction, bad pixel replacement, temperature mapping, frame integration, noise filtering, and automatic gain control. However, many of these functions can be off-loaded onto the consumer device 210 and need not be implemented in the thermal imaging camera itself. For instance, in at least certain embodiments, frame integration, noise filtering, and automatic gain control can be implemented on the consumer device or using the applications in the application layer 209 running thereon.

Interface module 205 can include, in at least certain embodiments, a Wi-Fi interface, a USB interface, any other wired or wireless interface, system communications functions, image and video throttling, temperature data throttling, monochrome video output, YCbCr conversion output, or H.264 encoding, and the like. However, many of these functions can also be off-loaded onto the consumer device 210 or applications running thereon and need not be implemented in the interface and control module 205 itself. In one embodiment, the functions and components of the thermal imaging module 201 are provided on an integrated circuit such as a Field Programmable Gate Array ("FPGA"), programmable logic device ("PLD"), applications specific integrated circuit ("ASIC"), system-on-a-chip ("SoC"), custom circuitry, or any combinations or equivalents thereof. In addition, in at least certain embodiments, the thermal imaging module 201 and interface module 205 can be located on separate integrated circuit chips or circuit boards or may be integrated into the same chip.

The applications layer 209 functions can include, in at least certain embodiments, graphical user interface ("GUI") display and user interface functions, command and control functions, image or video capture and storage, temperature measurements, temperature calculations, remote access, symbology, report processing, data storage and backup (e.g., via cloud computing), PC interface functions, color palettes, connectivity, web access, email, messaging, and social media functions, etc. Further, the consumer device 210 can provide many of the system functions such as powering the system, battery, USB and LED ports, as well as many basic camera functions, etc.

Figure 3:
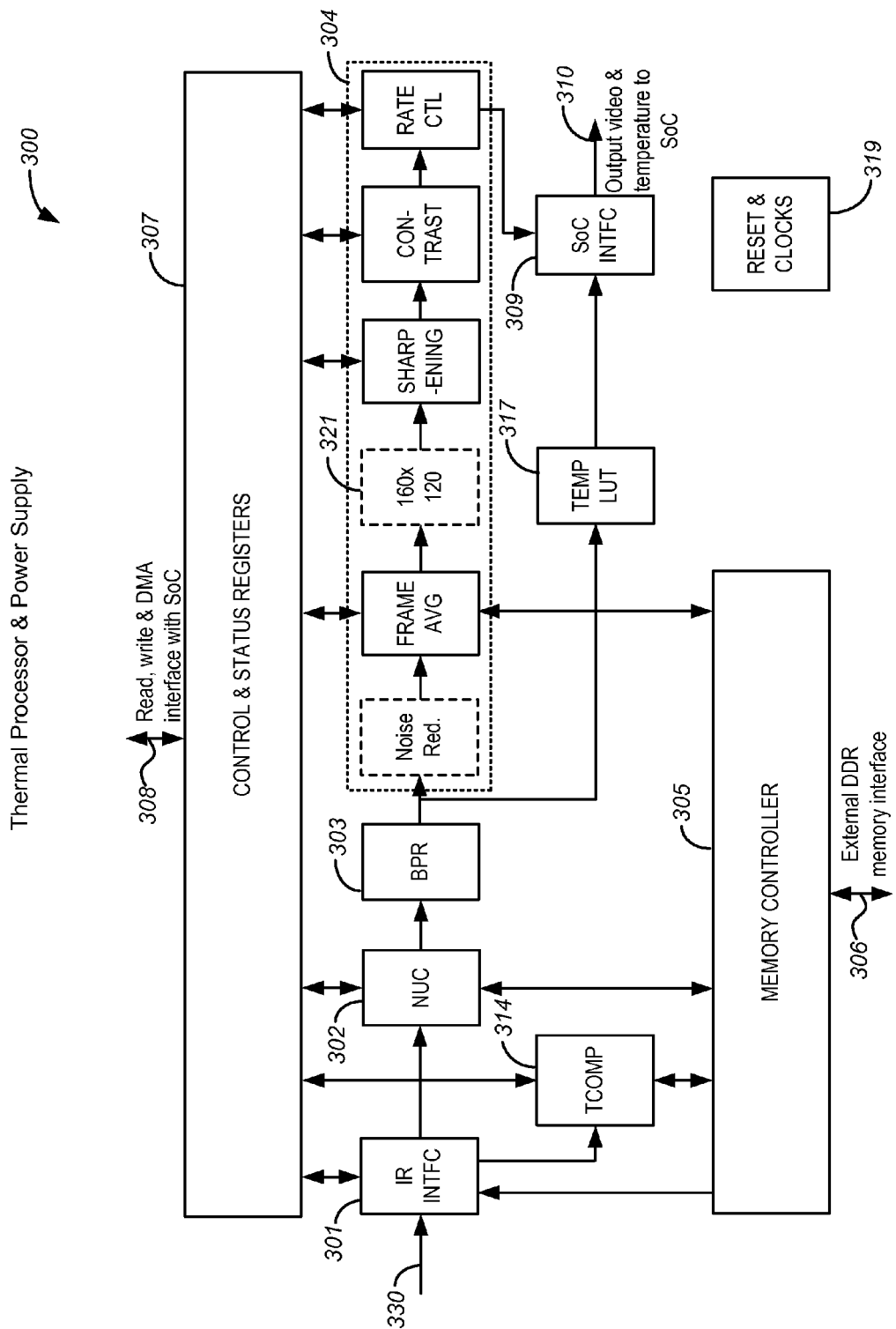
FIG. 3 is a simplified block diagram of a thermal camera processor according to an embodiment of the present invention.

FIG. 3 depicts an example block diagram of a thermal camera processor according to one embodiment. In the illustrated embodiment, thermal camera processor 300 includes a number of features that may be performed within a thermal camera, including thermal processing and power supply functions. In other embodiments, many of these features can be performed by a consumer device coupled with the thermal camera or applications running thereon. In one embodiment, the thermal camera processor 300 is provided on an integrated circuit such as a Field Programmable Gate Array ("FPGA"), programmable logic device ("PLD"), applications specific integrated circuit ("ASIC"), system-on-a-chip ("SoC"), custom circuitry, or any combinations or equivalents thereof.

Thermal camera processor 300 receives thermal images 330 at the infrared detector interface 301. This raw thermal data 330 is then processed to improve the utility and appearance of the thermal images associated with the data from an array of pixels within the infrared detector circuit 301 by performing non-uniformity correction (NUC) 302 and bad pixel replacement (BPR) 303 functions on the raw image data 330. Additional description related to NUC and BPR functions are provided in U.S. Pat. No. 9,251,595, issued on Feb. 2, 2016 and International Patent Application Publication No. WO 2014/160297, published on Oct. 2, 2014, the disclosures of which are hereby incorporated by reference in their entirety for all purposes.

Temperature compensation functions can be provided by temperature compensation unit 314, which receives the raw thermal data from the infrared detector interface 301. In some embodiments, the temperature compensation unit 314 uses factory calibration data to build the gains and offsets for each pixel as a function of detector temperature that are used in the NUC block. The temperature LUT 317 is a lookup table that, after pixels have been normalized and bad pixels have been replaced, converts the video levels to a set of black body temperatures that can be used as a temperature map of the scene. Additional description related to temperature maps is provided in International Patent Application Publication No. WO 2014/152681, published on Sep. 25, 2014, the disclosure of which is hereby incorporated by reference in its entirety for all purposes. Video data and temperature map data are both provided to the SoC interface 309 for output to the SoC, which creates a super frame containing both video and temperature data as described in additional detail in International Patent Application Publication No. WO 2014/152681, published on Sep 25, 2014.

Additional processing 304 may be further performed on the thermographic data including noise filtering (i.e., spatial filtering), frame averaging (i.e., temporal filtering), image sharpening and edge enhancement, contrast control to improve viewability, rate control, etc. As illustrated in FIG. 3, a sampling block 321 performs resolution control, for example, receiving a 320×240 video stream and de-sampling it down to 160×120 or other suitable resolution in order to support different product requirements, export control rules, or the like. Many of these functions may also be performed by a consumer device coupled with the thermal camera processor 300.

In addition, control and status registers 307 are provided to pass data (read and write 308) among the thermal processor 300, its memory (not shown), and a SoC (not shown) that provides much of the interface functions using SoC interface 309. A memory controller 305 may also be provided, as necessary, to perform data backup and storage functions 306 with an external memory. Thermal camera processor 300 further includes a temperature look-up table ("LUT") 317 to perform the temperature mapping, and has reset and clock circuitry 319 for system functions and synchronization. Embodiments of the present invention differ from conventional systems that merely provide video data to other systems since the thermal camera processor is able to provide temperature maps for the scene data in addition to the thermal video data. The integration of temperature data along with video data enables downstream applications that are not available using conventional techniques.

By distributing functionality between the thermal camera and the consumer mobile device, the camera and mobile device can perform functions for which they are well suited, improving system performance at reduced cost. As an example, the thermal imaging camera can include one or more of a non-uniformity correction component, a bad pixel replacement component, a temperature map component, a frame integration unit, a noise filter, and/or an automatic gain control unit. The consumer mobile device can perform one or more of visible camera functions, display functions, control functions, frame integration, noise filtering, and/or automatic gain control. Thus, the integrated system of thermal camera and consumer mobile device distributes functions and tasks, thereby utilizing assets efficiently.

Figure 4A:
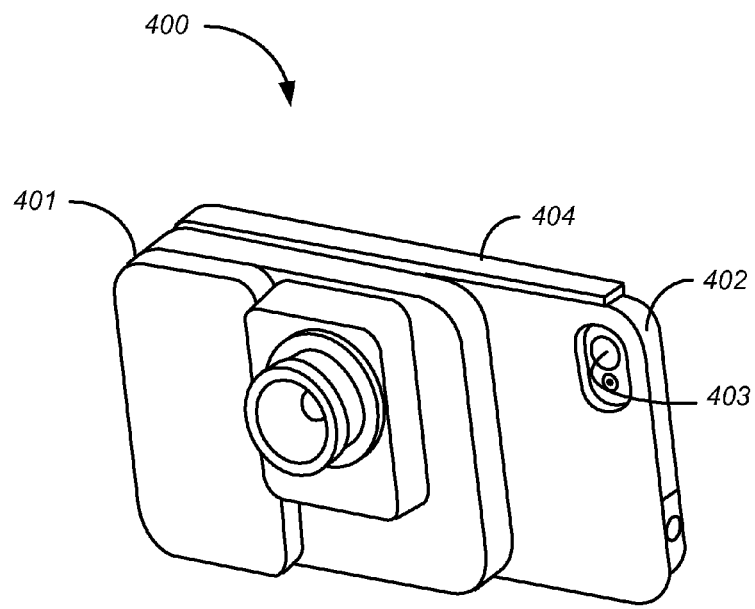
FIG. 4A is a perspective drawing of a thermal imaging device coupled to a consumer mobile device according to an embodiment of the present invention.
Figure 4B:
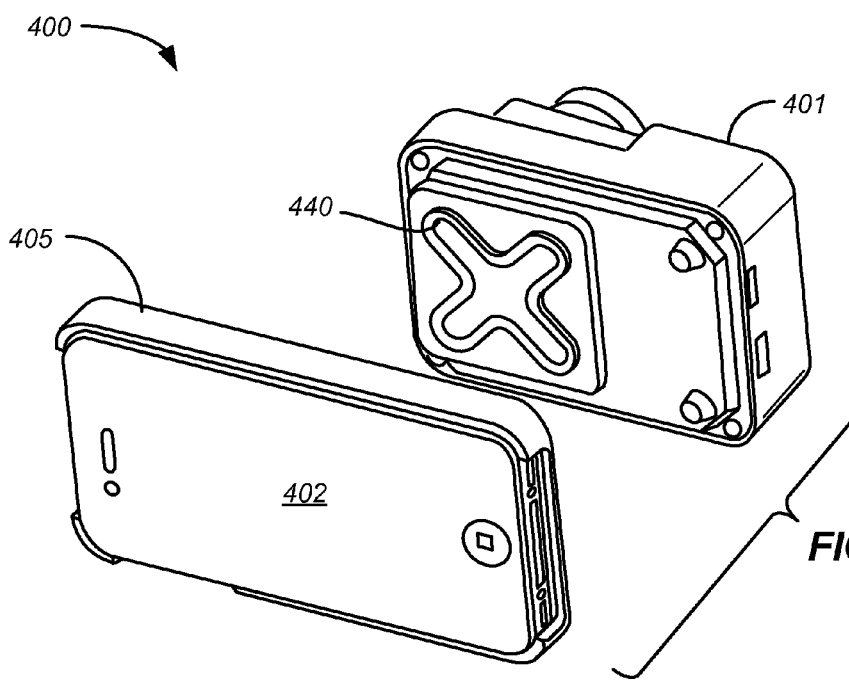
FIG. 4B is an exploded perspective drawing of the thermal imaging device and consumer mobile device illustrated in FIG. 4A.

FIG. 4A is a perspective drawing of a thermal imaging device coupled to a consumer mobile device according to an embodiment of the present invention. FIG. 4B is an exploded perspective drawing of the thermal imaging device and consumer mobile device illustrated in FIG. 4A. As illustrated in FIG. 4A, the thermal imaging system includes a thermal camera 401 (also referred to as a thermal imaging camera) coupled with a consumer mobile device 402 using a case 404 into which the consumer mobile device slides and is held during operation. The thermal camera and the consumer mobile device are coupled together in this embodiment, for example, using a physical coupling inside the case, a magnetic coupling, or the like so that the two elements remain joined together during operation. The coupling between the devices is such that the use is able to access the camera control functions of the consumer mobile device. The configuration of the coupling enables the visible camera 403 of the consumer mobile device to be utilized during operation.

Referring to FIG. 4B, a magnetic interface 440 includes magnets built into back cover of the thermal camera 401. A matching magnet interface (not shown) is provided on the case 405 in which the consumer mobile device 402 is positioned. This attachment mechanism allows the consumer mobile device to be oriented in landscape or portrait orientation. In some implementations, the consumer mobile device can be removed from its case, which remains attached to the thermal camera. Although not illustrated in FIG. 4A, the thermal camera 401 and the consumer mobile device 402 can be coupled together by one or more physical ports such as a USB port or a proprietary port on the consumer mobile device. One of ordinary skill in the art would recognize many variations, modifications, and alternatives.

Figure 5A:
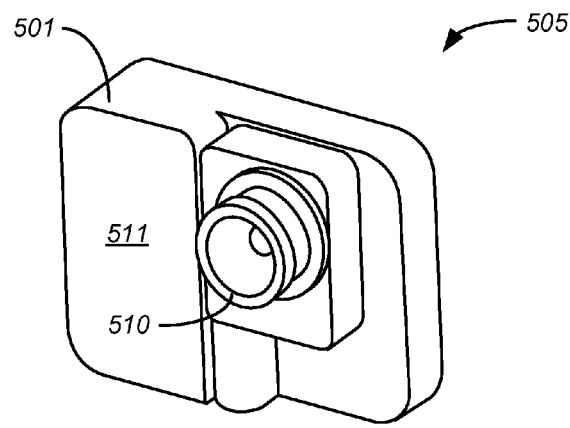
FIG. 5A is a perspective drawing of the front of a thermal imaging device according to an embodiment of the present invention.
Figure 5B:
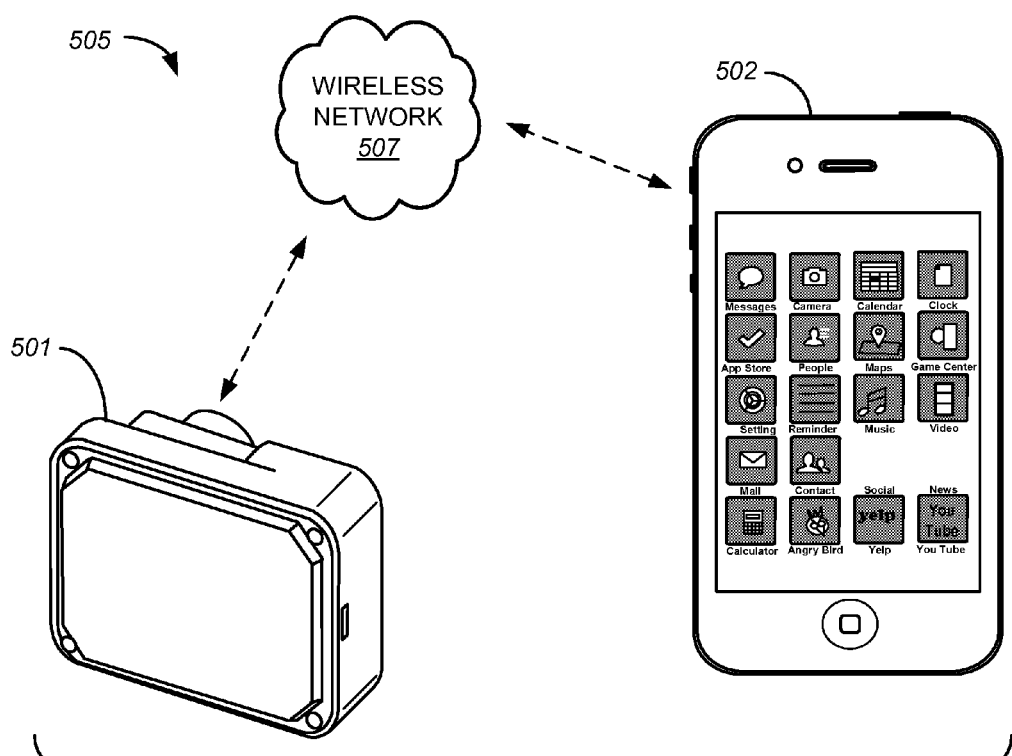
FIG. 5B is a perspective drawing of the back of the thermal imaging device illustrated in FIG. 5A coupled to a consumer mobile device using a wireless network according to an embodiment of the present invention.

FIG. 5A is a perspective drawing of the front of a thermal imaging device according to an embodiment of the present invention. FIG. 5B is a perspective drawing of the back of the thermal imaging device illustrated in FIG. 5A coupled to a consumer mobile device using a wireless network according to an embodiment of the present invention. As shown in FIG. 5A, the thermal camera 501 includes a lens 510 adjacent battery housing 511. In this implementation, the thermal camera 501 can be coupled to the consumer mobile device 502 in a remote mode in which the communications between the thermal camera and the consumer mobile device occur using a wireless network 507. Additionally, the thermal camera 501 can be coupled to the consumer mobile device using a wired connection such as a USB connection, through an audio jack, or the like. In some implementations, the connection of the thermal camera and the consumer mobile device using a wired connection frees up the mobile device's WiFi interface to communicate with other devices during operation. Exemplary wireless networks include a WiFi network, Bluetooth™, or the like to communicate data. In other embodiments, the remote mode of operation can be extended to include a mode in which the thermal camera and consumer device also utilize wired connections for one or more communications functions, providing a hybrid mode of operation.

Figure 6A:
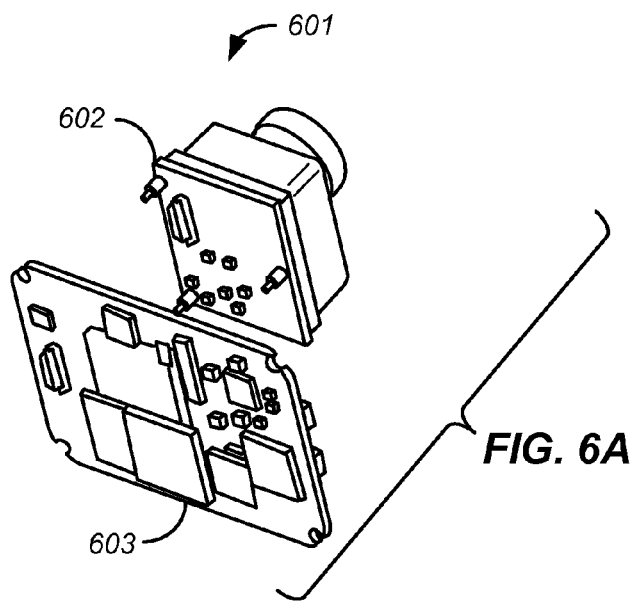
FIG. 6A is an exploded perspective drawing of a camera module according to an embodiment of the present invention.

FIG. 6A is an exploded perspective drawing of a camera module according to an embodiment of the present invention. In this exploded view, exemplary thermal imaging system components are illustrated. In the illustrated embodiment, thermal imaging system components includes a camera module 601 comprising a thermal cell assembly 602 and camera module assembly 603. In one embodiment, the thermal cell assembly 602 includes a thermal imaging module integrated circuit such as module 201 discussed above with respect to FIG. 2. Similarly, the camera module assembly 603 may include an interface and control module 205, including FPGA 121 and SoC 123 as discussed in relation to FIG. 1. However, the functions and components of the thermal cell assembly 602 and camera module assembly 603 may be located in any number of ways between the two modules, and the two modules may be separated or integrated together. A focus ring 605 is illustrated on the front of the thermal cell assembly 602.

Figure 6B:
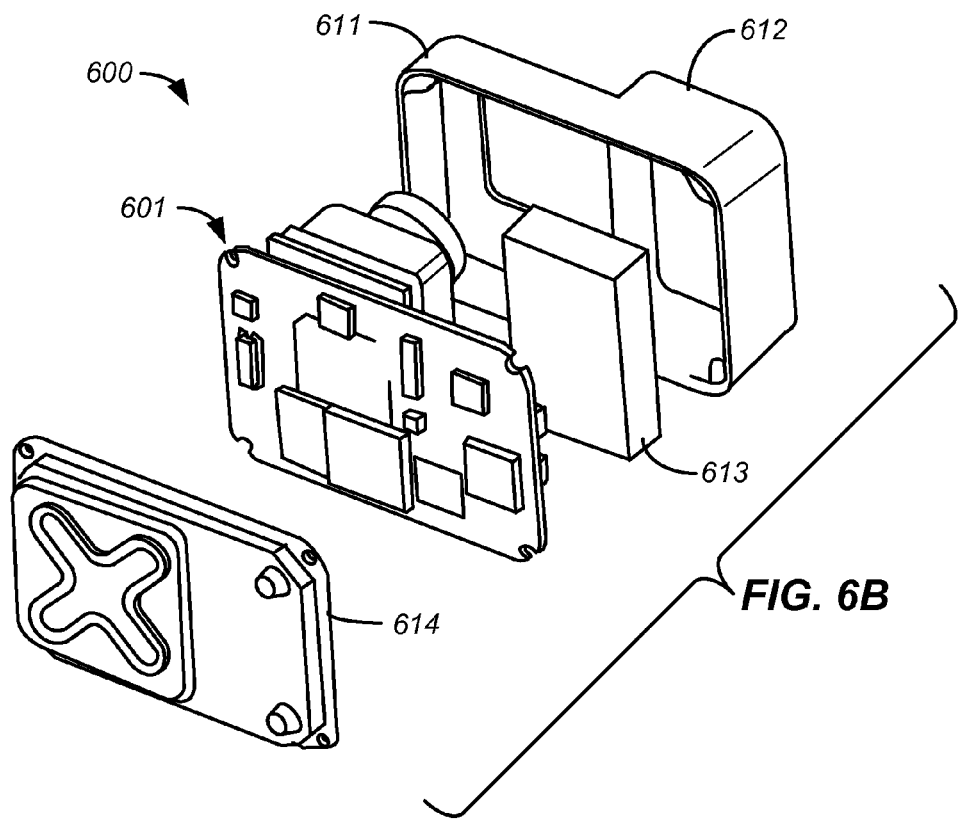
FIG. 6B is an exploded perspective drawing of components of the thermal camera according to an embodiment of the present invention.

FIG. 6B is an exploded perspective drawing of components of the thermal camera according to an embodiment of the present invention. The components include a rear housing 614. In the implementation illustrated in FIG. 6B, the rear housing, which can be fabricated from aluminum or other suitable material with mechanical rigidity, includes a magnetic coupling device as discussed in relation to FIG. 4B, but this is not required by the present invention. The camera module 601 is mounted to the rear housing 614. A battery 613 is mounted inside a portion of the front housing 611, which can be fabricated from a molded plastic member, an aluminum member, or other suitable material. An antenna 612 is integrated with the front housing 611 to provide for wireless communications between the thermal camera and the consumer mobile device as discussed in relation to FIG. 5.

Figure 7:
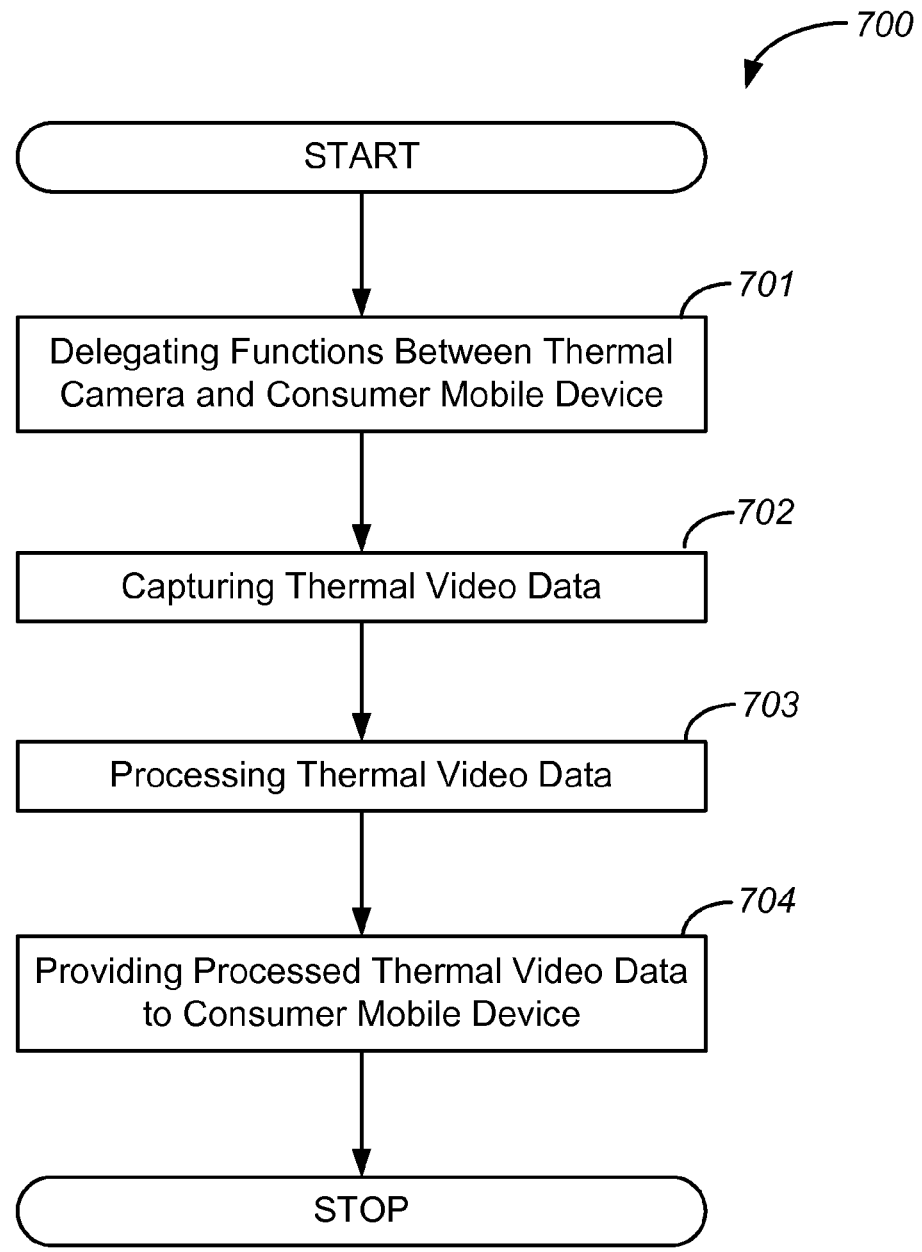
FIG. 7 is a simplified flowchart illustrating a method of operating a thermal imaging system according to an embodiment of the present invention.

FIG. 7 is a simplified flowchart illustrating a method of operating a thermal imaging system according to an embodiment of the present invention. Process 700 begins at operation 701, where the functions of the thermal imaging system are delegated between the thermal camera and the consumer device. The thermal imaging system then captures thermal video data (operation 702), processes it (operation 703), and provides the processed video data to the consumer device (operation 704). This completes process 700 according to one example embodiment.

According to an embodiment of the present invention, the method includes, at the thermal imaging camera, control signals from the consumer mobile device. In another embodiment, the method further includes providing certain components of the expandable architecture using the thermal imaging camera and providing remaining of the components of the expandable architecture using the consumer device or applications running thereon. Additionally, the method may include integrating hardware and software capabilities of the consumer device with capabilities of the thermal imaging camera. The expandable architecture can be compatible with different consumer devices having different applications running thereon. As an example, processing the thermal video data can include at least one of performing non-uniformity correction, performing bad pixel replacement, or generating a temperature map associated with the thermal video data. Additionally, processing the thermal video data can include at least one of performing frame integration, noise filtering, or automatic gain control. In an embodiment, the thermal imaging camera and the consumer mobile device are coupled via a wireless connection.

It should be appreciated that the specific steps illustrated in FIG. 7 provide a particular method of operating a thermal imaging system according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Provided below are descriptions of some devices (and components of those devices) that may be used in the systems and methods described above. These devices may be used, for instance, to receive, transmit, process, and/or store data related to any of the functionality described above. As will be appreciated by one of ordinary skill in the art, the devices described below may have only some of the components described below, or may have additional components.

Figure 8:
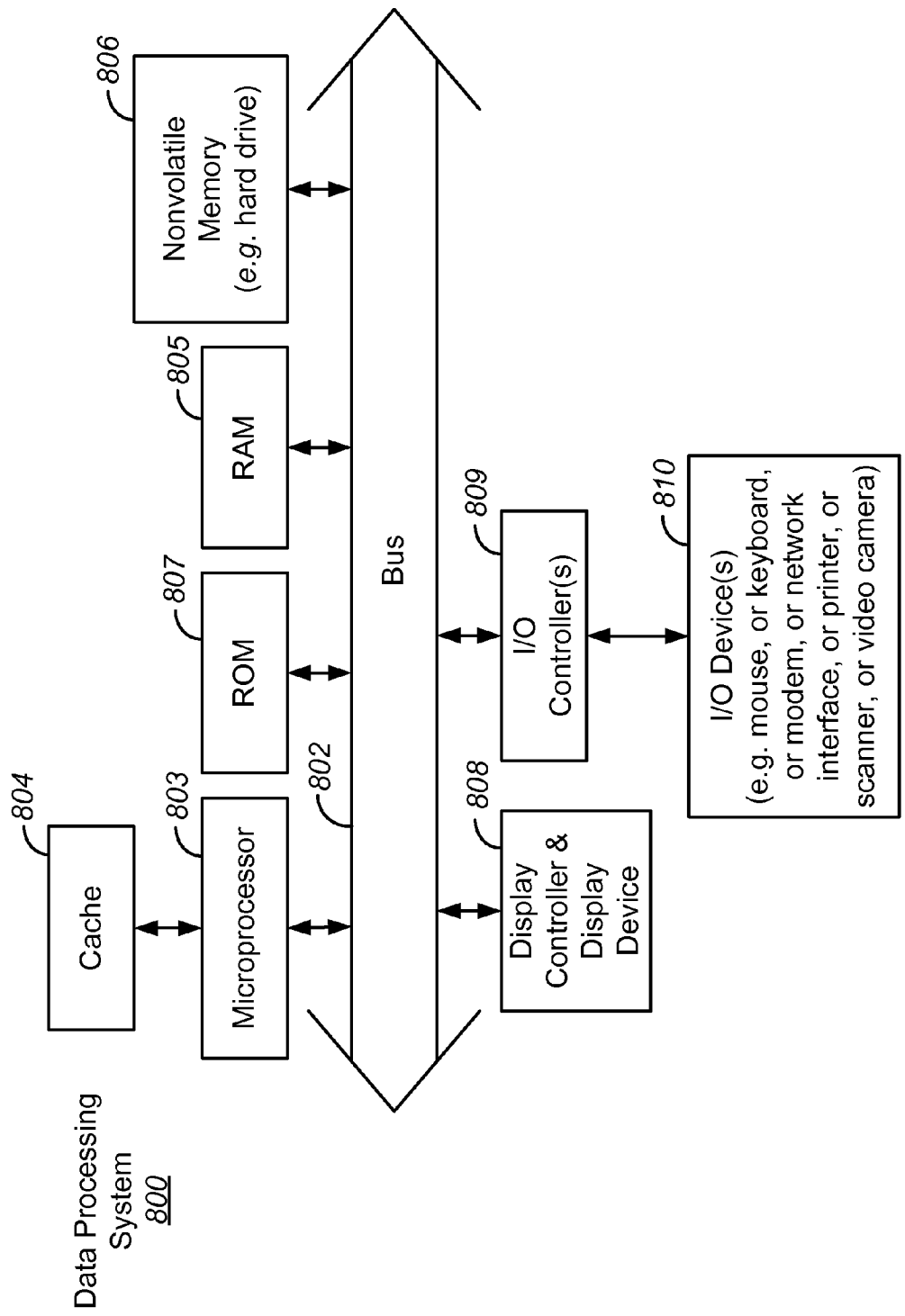
FIG. 8 is a simplified block diagram of a data processing system upon which the disclosed embodiments may be implemented.

FIG. 8 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network. FIG. 8 shows one example of a data processing system, such as data processing system 800, which may be used with the present described embodiments. Note that while FIG. 8 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 8 may, for example, be a personal computer (PC), workstation, tablet, smartphone or other hand-held wireless device, or any device having similar functionality.

As shown, the data processing system 801 includes a system bus 802 which is coupled to a microprocessor 803, a Read-Only Memory (ROM) 807, a volatile Random Access Memory (RAM) 805, as well as other nonvolatile memory 806. In the illustrated embodiment, microprocessor 803 is coupled to cache memory 804. System bus 802 can be adapted to interconnect these various components together and also interconnect components 803, 807, 805, and 806 to a display controller and display device 808, and to peripheral devices such as input/output ("I/O") devices 810. Types of I/O devices can include keyboards, modems, network interfaces, printers, scanners, video cameras, or other devices well known in the art. Typically, I/O devices 810 are coupled to the system bus 802 through I/O controllers 809. In one embodiment the I/O controller 809 includes a Universal Serial Bus ("USB") adapter for controlling USB peripherals or other type of bus adapter.

RAM 805 can be implemented as dynamic RAM ("DRAM") which requires power continually in order to refresh or maintain the data in the memory. The other nonvolatile memory 806 can be a magnetic hard drive, magnetic optical drive, optical drive, DVD RAM, or other type of memory system that maintains data after power is removed from the system. While FIG. 8 shows that nonvolatile memory 806 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 800, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

According to another embodiment of the present invention, methods and apparatuses for multi-sensor optical systems are provided. By way of example, these techniques have been applied to mitigate alignment errors in dual-sensor optical systems referred to as "parallax," however, these techniques can be applied to a variety of optical systems including systems having multiple optical sensors.

According to certain embodiments, a multi-sensor camera system is provided including a first optical sensor having a focus mechanism to adjust its focus and a second optical sensor mounted inside the focus mechanism of the first optical sensor. This configuration reduces the physical separation between the optical axes of the optical sensors and the resulting parallax error between the first optical sensor and the second optical sensor. The first and second optical sensors can be disposed such that the radial distance between the optical axes of the two optical sensors is not limited by the focus mechanism. Furthermore, the focusing mechanism of the first optical sensor only negligibly affects the focus of the second optical sensor.

In yet other embodiments, a method for reducing parallax error in a multiple-sensor camera system is provided. Any combination of optical sensor types may be used. For example, the first optical sensor can be a thermal sensor adapted to capture images in the infrared spectrum and the second optical sensor can be a visible optical sensor adapted to capture images in the visible spectrum. The second optical sensor can be a fixed-focus optical sensor or have an independent focus mechanism. Other types of imaging systems can also be used and are within the scope of this disclosure.

Embodiments of the present invention reduce or eliminate alignment error between imagery of the first and second optical sensors without cumbersome manual alignment readjustment when the distance to an object to be imaged changes and without the need for automatic parallax adjustment mechanisms.

Figure 9:
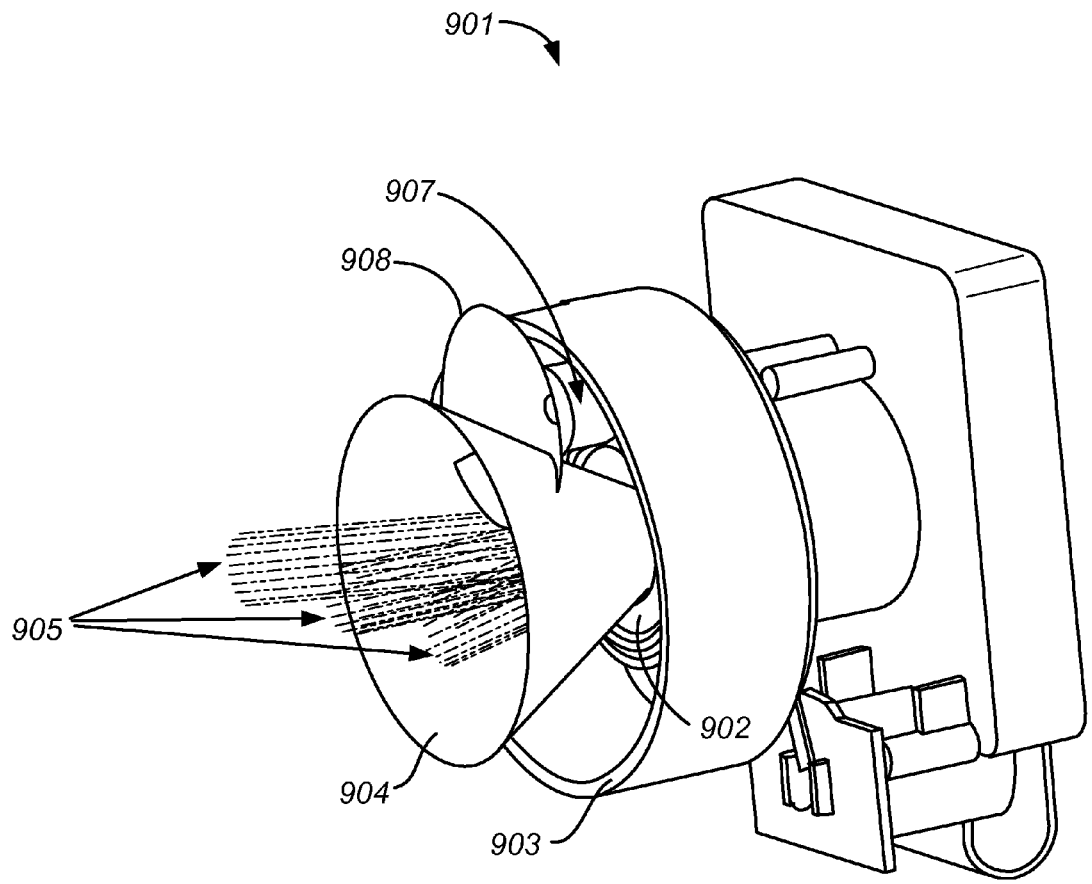
FIG. 9 is a perspective drawing of a multi-camera system according to an embodiment of the present invention.

FIG. 9 is a perspective drawing of a multi-camera system according to an embodiment of the present invention. As illustrated in FIG. 9, the optical sensor system 901 includes two or more image sensors (e.g., a thermal optical sensor a color visible sensor). An image sensor is a device that converts an optical image into an electronic signal. When two or more image sensors from distinct cameras view a scene from different vantage points, it creates an alignment error called "parallax" between the two cameras. This alignment error is a function of the distance of objects in the scene from the camera and is generally the greatest when objects in the scene are very close. Parallax error causes misalignment between video or images from cameras at different vantage points. This misalignment causes a problem when the imagery observed from the vantage points of both cameras is displayed simultaneously (e.g., in a graphical user interface). Simultaneous display methods are well known and include, for example, overlay methods such as picture-in-picture ("PiP") or image or video fusion. Multi-sensor image/video fusion is the process of integrating information from two or more images into a single image. The resulting image can be more informative than any of the input images standing alone. Methods exist to perform image fusion.

The relative alignment between the images can be adjusted manually, but this can be cumbersome and the alignment changes depending on object distance, and, thus, must be realigned every time the object distance changes. In addition, some conventional systems have devised methods of adjusting the relative alignment between the images automatically based on a determination of the distance at which each camera is focused. But these methods can be quite complex and costly. Other manual focus systems typically determine the object distance at which the camera is focused. These systems require focus position sensors and factory calibration of each camera system.

The techniques described herein include methods for mounting one or more cameras in a multi-camera system inside the focus mechanism of one of the other cameras. This design reduces or minimizes the parallax error between the cameras so configured and increases or maximizes the object distance range over which the images are well-aligned. Mounting the second camera (e.g., the visible camera) inside the focus ring of the first camera (e.g., the infrared camera) allows for very small parallax errors to be achieved, thereby reducing the alignment error between the imagery of the multiple cameras. In one embodiment, the focus mechanism is a focus ring.

As illustrated in FIG. 9, the first camera 902 can be a thermal camera adapted to capture images in the thermal spectrum (i.e., the infrared band) and the second camera 907 can be a visible camera adapted to capture images in the visible spectrum. But the techniques described herein are not limited to any particular type of cameras or any segment of the electromagnetic spectrum. For instance, these techniques may be used with other imaging devices or systems including medical resonance imaging ("MRI") systems, x-ray systems, acoustic imaging systems, stereoscopic imaging, or the like.

Due to the optical properties of photographic lenses, only objects within a limited range of distances from the camera will be reproduced clearly. The process of adjusting this range is known as changing the camera's focus. There are numerous ways of focusing a camera accurately. The simplest cameras have fixed focus and can be configured with a small aperture and wide-angle lens to ensure that everything within a certain range of distance from the lens, from some close range to infinity, is in reasonable focus. Fixed focus cameras are usually inexpensive, such as single-use cameras. The camera can also have a limited focusing range or scale-focus that is indicated on the camera body. Other forms of cameras include rangefinder cameras that are adapted to measure the distance to objects in a scene by means of a coupled parallax unit on top of the camera, allowing the focus to be set with accuracy. Most modern cameras offer autofocus systems to focus the camera automatically by a variety of methods.

In the embodiment illustrated in FIG. 9, multi-sensor camera system 901 includes a first camera 902 with a first optical sensor having a lens with a focusing mechanism 903. Conceptually, focus mechanism 903 for the first optical sensor has a viewing cone 904 that includes a multitude of directions 905 from which light from an object at a distance can be viewed and captured. In the illustration, only three of the many possible angles of light incidence is shown.

Multi-sensor camera system 901 further includes a second camera 107 with a second optical sensor having a lens (with or without a focusing mechanism—i.e., the second camera may be a fixed focus camera). This lens also has a viewing cone 108 that includes a multitude of directions (not shown) from which light from an object at a distance can be viewed and captured. As shown in FIG. 9, the multi-sensor camera system 901 can be configured such that the second camera is mounted inside the focusing mechanism 903 of the first camera in the system.

Rotation of the focusing mechanism 903 should preferably have little impact on the focus of the second camera since if the second camera is translated axially due to the rotation of the focus mechanism, the displacement is small enough to have a negligible impact on the object focus of the second camera. Thus, embodiments of the present invention include axial movement of the second camera attendant with rotation of the focusing mechanism or no axial motion as appropriate to the particular application.

Embodiments of the present invention utilize a camera geometry in which the parallax error is reduced to a level such that, for typical viewing distances, no parallax correction is necessary. Thus, position sensors utilized in conventional designs are not necessary.

Figure 10:
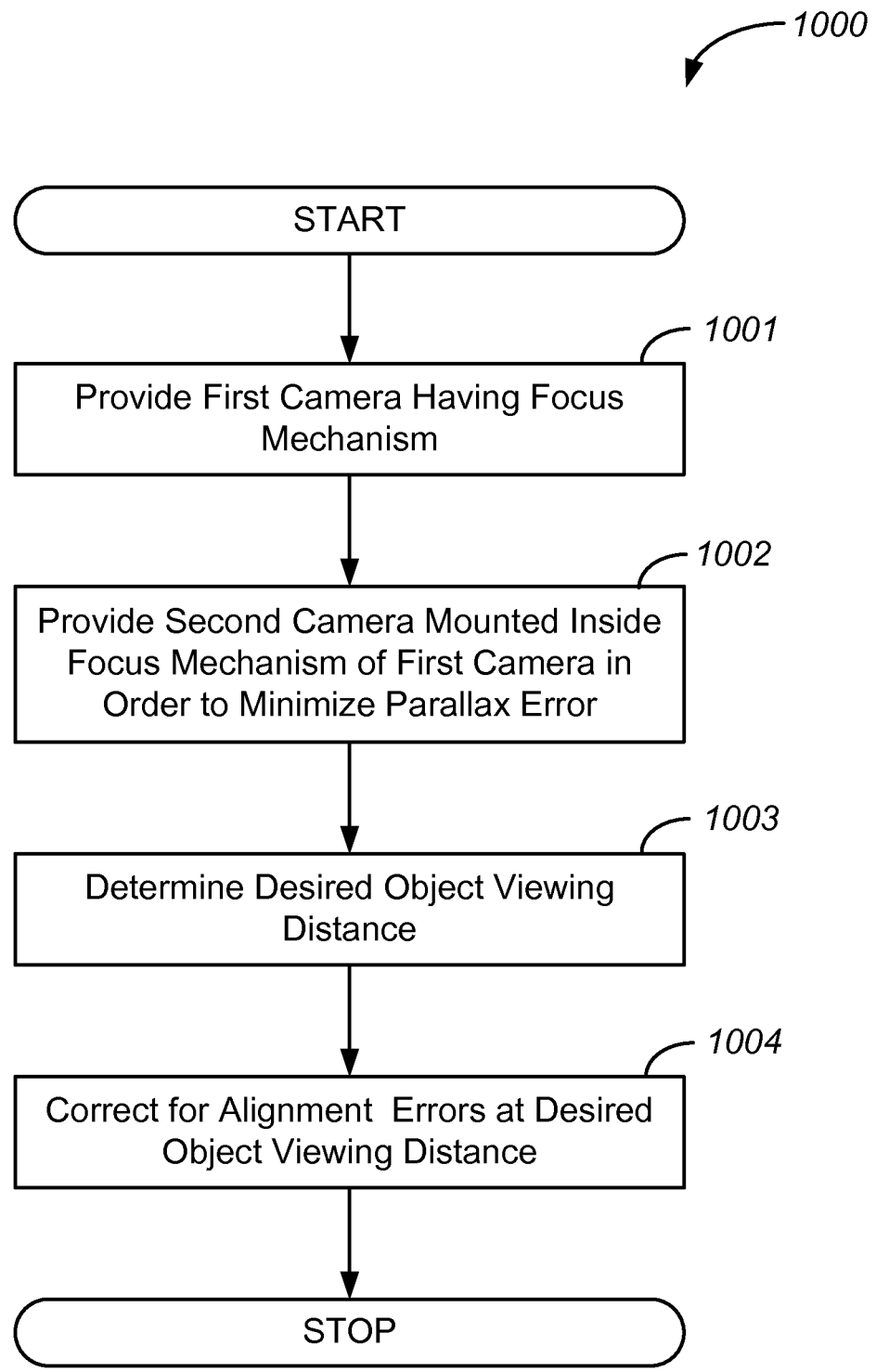
FIG. 10 is a simplified flowchart illustrating a method of reducing parallax according to an embodiment of the present invention.

FIG. 10 is a simplified flowchart illustrating a method of reducing parallax according to an embodiment of the present invention. In the illustrated embodiment of this method of reducing parallax alignment errors in a multi-sensor camera system, process 1000 begins at operation 1001 where a first camera having a focus mechanism is provided in a multi-sensor camera system. Process 1000 continues at operation 1002 where a second camera is provided in the multi-sensor camera system and is coupled with the first camera. The second camera is mounted inside the focus mechanism of the first camera. This configuration reduces or minimizes the alignment error between the first and second optical sensors referred to as "parallax." The method includes determining a desired object viewing distance (1003), for example, by utilizing a sensor that determines the focal length of the focusing mechanism, and correcting for alignment errors at the desired object viewing distance (1004) based on the desired object viewing distance and the distance between the optical axes of the two cameras. In some embodiments, the slight parallax error associated with the lateral offset between the two cameras can be compensated by selecting a distance for optimization and then using software to offset one or both of the images to perform the parallax correction. An alternative embodiment measures the focal position of the focusing mechanism and based on this distance, provides parallax reduction in real time. This completes process 1000 according to one illustrative embodiment.

It should be appreciated that the specific steps illustrated in FIG. 10 provide a particular method of reducing parallax error according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

According to an embodiment of the present invention, a multi-sensor camera system is provided. The multi-sensor camera system includes a first camera (also referred to as a first optical sensor) having a focus mechanism. The first camera can include a thermal sensor adapted to capture images in the infrared band. The focus of the first camera is adjusted using the focus mechanism. The multi-sensor camera system also includes a second camera (including a second optical sensor) mounted inside the focus mechanism of the first optical sensor. The second optical sensor can include a visible optical sensor adapted to capture images in the visible spectrum and can utilize a fixed-focus optical sensor. The second camera can also utilize an independent focus mechanism (e.g., autofocus). The radial distance between optical axes of the first and second optical sensors is not limited by the focus mechanism. The mounting of the second camera inside the focus mechanism of the first camera reduces parallax error between the first and second cameras.

In a particular embodiment, alignment error is minimized or reduced between imagery of the first and second cameras without manual alignment readjustment when the distance to an object to be imaged changes. In other embodiments, alignment error is minimized or reduced between the imagery of the first and second optical sensors without automatic parallax adjustment. According to some embodiments, focusing the first camera only negligibly affects focus of the second camera. One of ordinary skill in the art would recognize many variations, modifications, and alternatives.

According to another embodiment of the present invention, a method for reducing parallax error in a multiple-sensor camera system is provided. The method includes providing a first optical sensor having a focus mechanism. The focus of the first optical sensor is adjusted using the focus mechanism. The method also includes providing a second optical sensor mounted inside the focus mechanism of the first optical sensor. This mounting technique reduces the parallax error between the first optical sensor and the second optical sensor. The radial distance between optical axes of the first and second optical sensors is not limited by the focus mechanism.

In one implementation, the first optical sensor can be a thermal sensor adapted to capture images in the thermal spectrum and the second optical sensor can be a visible optical sensor adapted to capture images in the visible spectrum. Alignment error is reduced or minimized between imagery of the first and second optical sensors without manual alignment readjustment when the distance to an object to be imaged changes in some embodiments. In other embodiments, alignment error is reduced or minimized between the imagery of the first and second optical sensors without automatic parallax adjustment. Some implementations include manually readjusting the focus to reduce any residual alignment error. The second optical sensor can utilize a fixed-focus optical sensor or an independent focus mechanism. Focusing the first optical sensor can only negligibly affect focus of the second optical sensor.

According to another specific embodiment of the present invention, a multi-camera system is provided that includes a first camera having a focus mechanism and a second camera mounted inside the focus mechanism of the first camera. A viewing cone of the first camera is adjusted using the focus mechanism. The placement of the second camera inside the focus mechanism of the first camera reduces parallax error between the first and second cameras and the radial distance between optical axes of the first and second cameras is not limited by the focus mechanism of the first camera.

Throughout the foregoing description, for the purposes of explanation, numerous specific details were set forth in order to provide a thorough understanding of the invention.

It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A thermal imaging system comprising:
   a thermal imaging camera including:
   an infrared detector operable to capture thermographic data, wherein the thermographic data includes a plurality of frames of thermal infrared data;
   a temperature map component coupled to the infrared detector and operable to create a mapping for each frame of the plurality of frames of thermal infrared data based on the thermographic data and to generate a temperature map using the mapping;
     a processor coupled to the infrared detector and operable to process the thermographic data; and
     at least one communications interface configured to transmit a plurality of super frames of thermal infrared data, each super frame comprising a frame of thermal infrared data and a corresponding the temperature map; and
   a consumer mobile device communicatively coupled to the thermal imaging camera.

2. The thermal imaging system of claim 1 wherein the thermal imaging camera further comprises:
   a non-uniformity correction component; and
   a bad pixel replacement component.

3. The thermal imaging system of claim 1 wherein the thermal imaging camera further comprises:
   a frame integration unit;
   a noise filter; and
   an automatic gain control unit.

4. The thermal imaging system of claim 1 wherein the at least one communications interface comprises a wireless interface.

5. The thermal imaging system of claim 4 wherein the thermal imaging camera is coupled to the consumer mobile device via a WiFi wireless network.

6. The thermal imaging system of claim 1 wherein the at least one communications interface comprises a wired interface.

7. The thermal imaging system of claim 6 wherein the wired interface comprises a Universal Serial Bus (USB) connection.

8. A method of operating a thermal imaging camera as an element of an expandable architecture, the method comprising:
   capturing thermographic video data using an infrared detector of the thermal imaging camera, wherein the thermographic video data includes a plurality of frames of thermal infrared data;
   generating a mapping for each frame of the plurality of frames of the thermal infrared data;
   generating the a temperature map based on at least the mapping, wherein the temperature map is generated prior to a contrast enhancement process of the thermographic video data;
   processing the thermographic video data using a processor coupled to the infrared detector; and
   providing the temperature map and the processed thermographic video data concurrently as a plurality of super frames of thermal infrared data, each super frame comprising a frame of processed thermographic video data and a corresponding temperature map in a data channel as a data stream via an interface of the thermal imaging camera to a consumer mobile device.

9. The method of claim 8 further comprising receiving, at the thermal imaging camera, control signals from the consumer mobile device.

10. The method of claim 8, further comprising:
    providing certain components of the expandable architecture using the thermal imaging camera; and
    providing remaining of the components of the expandable architecture using the consumer mobile device or applications running thereon.

11. The method of claim 8, further comprising integrating hardware and software capabilities of the consumer mobile device with capabilities of the thermal imaging camera.

12. The method of claim 8, wherein the expandable architecture is compatible with different consumer mobile devices having different applications running thereon.

13. The method of claim 8 wherein processing the thermal video data comprises at least one of performing non-uniformity correction, or performing bad pixel replacement.

14. The method of claim 8, wherein processing the thermographic video data comprises at least one of performing frame integration, noise filtering, or automatic gain control.

15. The method of claim 8 wherein the thermal imaging camera and the consumer mobile device are coupled via a wireless connection.

16. The method of claim 8 wherein the thermal imaging camera and the consumer mobile device are coupled via a wired connection.

17. A thermal imaging camera comprising:
    an infrared detector operable to capture thermographic video data, wherein the thermographic video data includes a plurality of frames of thermal infrared data;
    a processor coupled to the infrared detector and operable to process the thermographic video data;
    a temperature map component coupled to the infrared detector and operable to create a mapping for each frame of the plurality of frames based on the thermographic video data, and to generate a temperature map using the mapping; and
    at least one communications interface operable to transmit a plurality of super frames of thermal infrared data, each super frame comprising a frame of thermographic video data and a corresponding temperature map to a consumer mobile device coupled thereto.

18. The thermal imaging camera of claim 17 wherein the portable thermal imaging camera is operable to provide a plurality of thermography functions and the consumer mobile device is operable to provide enhanced functions utilizing capabilities of the consumer mobile device.

19. The thermal imaging camera of claim 17 wherein the processor includes an FPGA performing non-uniformity correction, and bad pixel replacement.

20. The thermal imaging camera of claim 17 wherein the thermal imaging camera is coupled with a consumer device via a wired or wireless connection.

21. The thermal imaging camera of claim 20 wherein the thermal imaging camera is coupled to a consumer device via a Universal Serial Bus (USB) connection.

22. The thermal imaging camera of claim 20 wherein the thermal imaging camera is coupled to a consumer device via a WiFi wireless network.

* * * * *